(No Model.) 2 Sheets—Sheet 1.

N. SMITH.
VELOCIPEDE.

No. 536,549. Patented Mar. 26, 1895.

Witnesses
W. T. Norton
John W. Dudley.

Inventor
Neil Smith
By F. K. Brown his Attorney

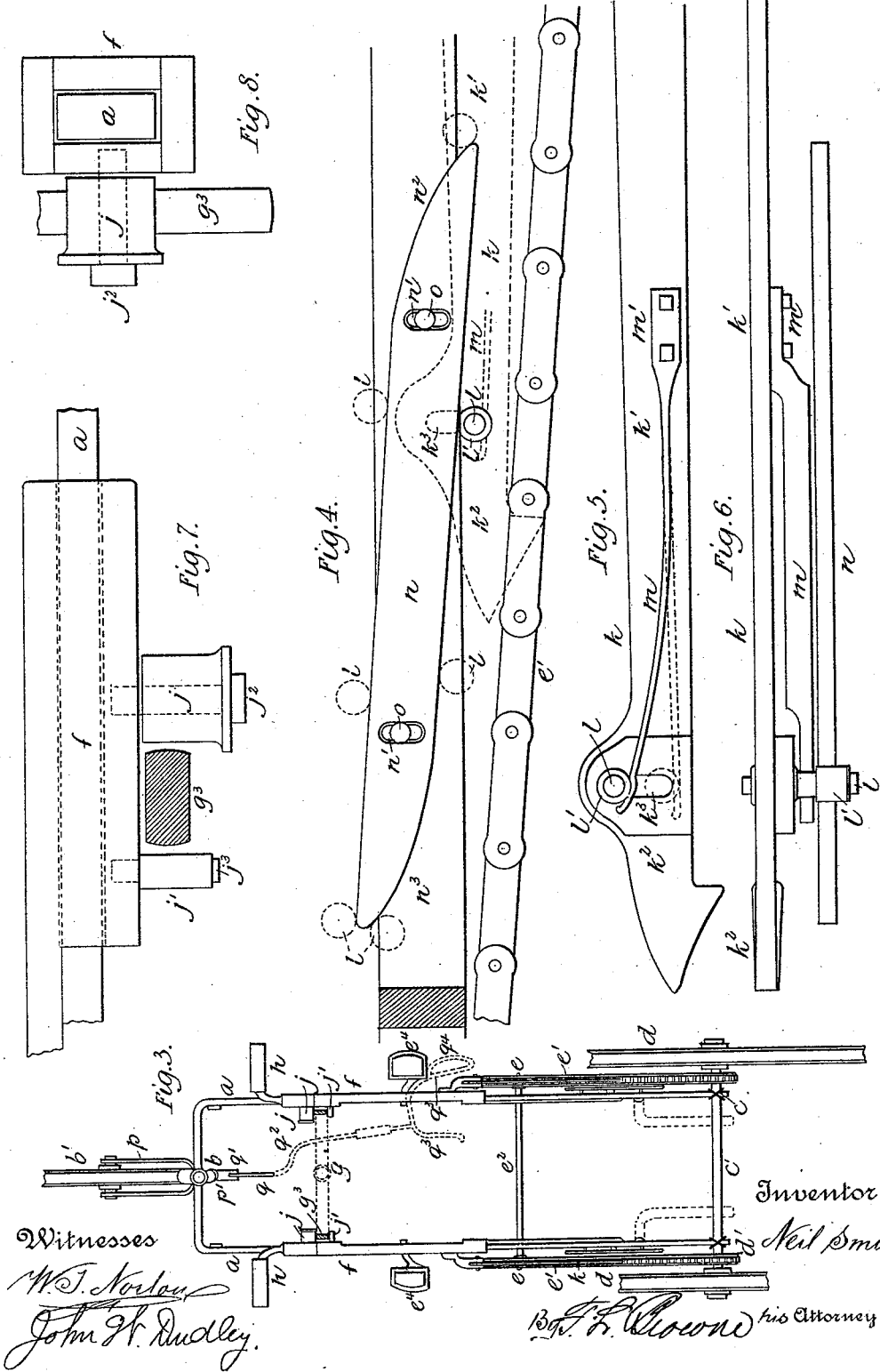

UNITED STATES PATENT OFFICE.

NEIL SMITH, OF SUPERIOR, WISCONSIN.

VELOCIPEDE.

SPECIFICATION forming part of Letters Patent No. 536,549, dated March 26, 1895.

Application filed July 24, 1894. Serial No. 518,471. (No model.)

*To all whom it may concern:*

Be it known that I, NEIL SMITH, a citizen of the United States, residing at Superior, in the county of Douglas and State of Wisconsin, have invented certain new and useful Improvements in Velocipedes; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention is directed to velocipedes, and especially to that class thereof which are known in the art as tricycles, or in other words manually propelled vehicles employing three wheels, two of which are drivers and the third the steering wheel; and the invention has for its object the production of a velocipede possessing advantages in point of simplicity, durability and cheapness of manufacture, and ease of operation.

The nature of my invention will appear from a reading of the following description taken in connection with the accompanying drawings which form a part of this specification, and in which—

Figure 2:
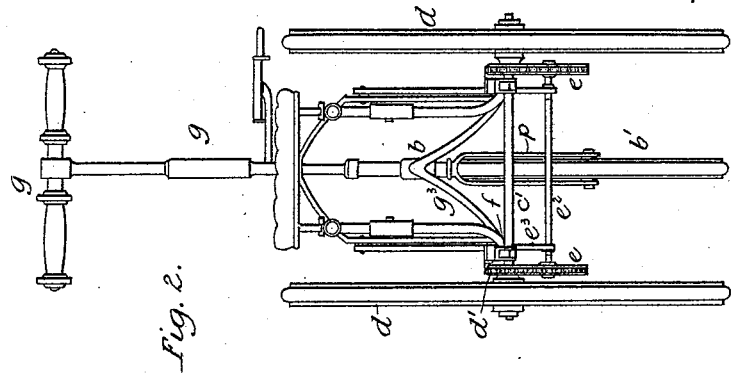
Figure 1:
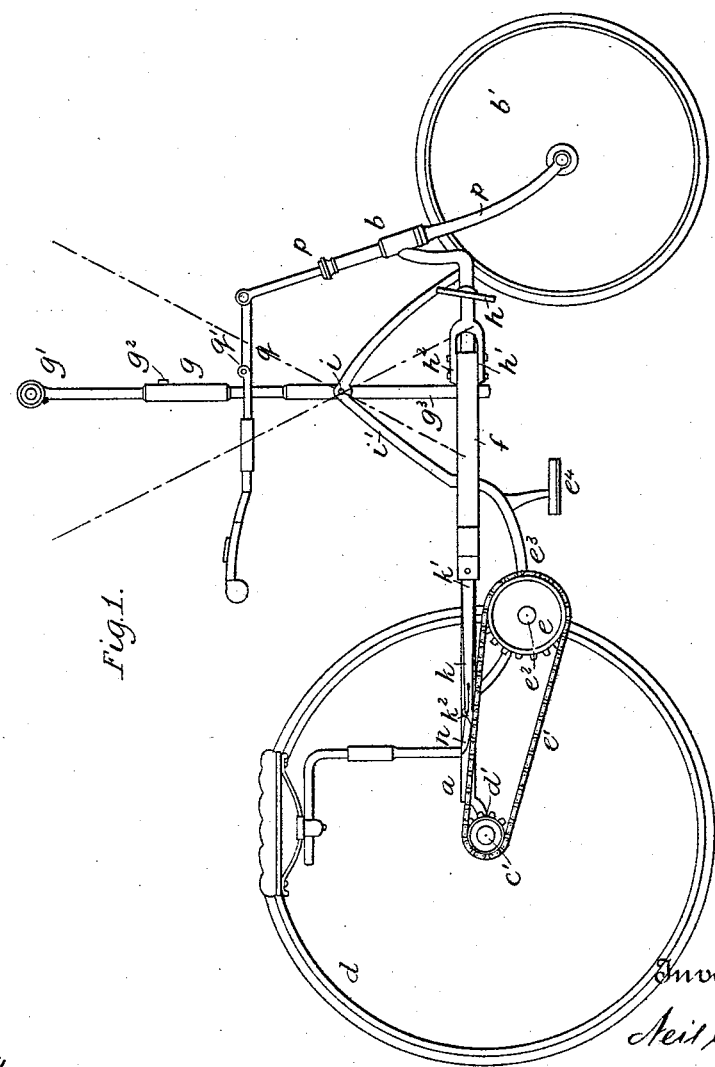

Figure 1 is a side elevation of my improved machine. Fig. 2 is a rear view of the same. Fig. 3 is a plan view. Fig. 4 is an elevation of a portion of the frame and chain showing the chain hook carrier and chain hook, the latter being in dotted lines. Fig. 5 is an elevation of the chain hook. Fig. 6 is a plan view of the chain hook, carrier and spring, and Figs. 7 and 8 are detail views of parts enlarged.

Referring to the drawings by letter, $a\ a$, denote the side frames of the machine which are rectangular in cross section, and bent inward and upward at their forward ends for connection with the head $b$ of the steering wheel $b'$. To the rearward ends of the frames is secured, by means of clips $c$, the axle $c'$ on the outer ends of which the driving wheels $d\ d$ are loosely mounted.

$d'\ d'$ are sprocket wheels secured fixedly to the inner side of the driving wheels and connected to other sprocket wheels $e\ e$ by means of sprocket chains $e'\ e'$ passed around each set of wheels $d'$ and $e$. The wheels $e$ are loosely mounted on the outer ends of an axle $e^2$ supported by brackets $e^3$ secured to and depending from the side frames $a$, these brackets $e^3$ also carrying the mounting and dismounting steps $e^4\ e^4$, which may be also used for foot rests in coasting if desired.

Instead of driving the sprocket wheels $e$ and thereby actuating the chains as in the ordinary tricycle, the chains are directly actuated by mechanism adapted to be operated by the combined action of the hands and feet of the operator, as follows: On each of the side frames are arranged slide boxes $f\ f$ which are adapted to be reciprocated on said frames through a hand operated lever $g$, and foot operated pedals $h$, the latter being rigidly but adjustably secured to the forward ends of the boxes by yokes $h'$ and bolts or screws $h^2$ as shown. The lever $g$ carries at its upper end a handle bar $g'$ which is vertically adjustable by reason of the set screw $g^2$, and said lever is divided and terminates in two arms $g^3\ g^3$ which are pivotally secured at $i'$ to stanchions $i\ i$ secured to and extending above the side frames. The lower ends of the arms $g^3$ are confined between two rollers $j\ j'$ secured to the slide boxes by pins or bolts $j^2\ j^3$, one of said rollers being flanged to prevent the lateral movement of said arm.

Pivotally secured to each of the forward ends of the boxes is a hook $k$, the connection being made at the inner end of the shank $k'$, and adjacent to the hook portion $k^2$ there is a vertical slot $k^3$ in which works a pin $l$ which carries at its outer end a roller $l'$. This pin and roller are normally held in the upper end of the slot by the action of a leaf spring $m$ which has its free end bearing against the under side of said pin, and is secured at its other end to the shank at $m'$. Each of the hooks in practice engage, as the slide boxes are moved forward, one of the links of the upper turn of the sprocket chain, and imparts travel to the latter which in turn drives the wheels $d$ through the sprocket wheels $d'$ and causes the machine to be propelled in a forward direction. By this arrangement, and the employment of hand and foot operated mechanism for actuating the boxes, it will be seen that a large amount of power is obtained with the exercise of comparatively small labor. The driving mechanisms are duplicated on each side and operate simultaneously, thus giving a very steady movement to the machine.

To enable the hooks to clear the chain on their return movement, I provide what I term "carriers," which consist of bars $n\ n$, adjustably secured to the side frames, slots $n'\ n'$ being formed in said bars near each end; and with the screws $o, o$ engaging the slots, a vertical or tilting adjustment of said bars is permitted. The forward upper side $n^2$ of said carrier as well as the rearward lower side $n^3$ thereof are curved to reduce the ends of the carrier, for a purpose to be presently explained. The carriers are arranged at an angle to the side frames, with their forward ends below the lower side of the frames and their rearward ends above the upper side of said frames, this position however varying with the movement of the hook for which it is designed.

In operation, supposing a hook to be moving rearwardly or backward after finishing its forward or active traverse; the roller being in the upper end of the slot and in the path of the forward end of the carrier is engaged by said end and the curved surface causes the same to ascend and carry with it the hook free from contact with the chain until the rear end of the carrier is reached, when the hook being released falls below said end and commences its forward or active traverse. The roller now engages the curved surface of the rearward lower side of the carrier and is caused thereby to move to the lower end of the slot against the action of the leaf spring, the hook meanwhile engaging one of the links, and these positions of the parts are maintained until the end of the forward traverse is reached, when the spring restores the normal position of the roller which has by this time passed the forward end of the carrier, and the hook starts on its backward or idle traverse. By this arrangement the roller and the spring perform the double function of first maintaining the engagement of the hook and chain during the forward movement, and second, of carrying the hook in its backward movement free of said chain.

The steering wheel $b'$ is mounted in the lower end of a fork $p$ which is movably secured in the head $b$. The post $p'$ which connects with said fork terminates in a rearwardly extending steering rod $q$ which has a half-knuckle joint $q'$ which enables the same to be raised over and in front of the handle bar where it is free to be moved by hand sidewise for the purpose of turning the steering wheel. I prefer however that the steering be accomplished independent of the hands, and for that reason the rod is offset at $q^2$ and terminates in two arms $q^3\ q^3$ which, when the rod is lowered, span one knee of the operator and permit of the steering by the lateral movement of the leg. The half knuckle joint limits the downward movement of the rod, and between the said joint and the arms are a sleeve and set screw by which the length of the rod may be adjusted to suit the rider. On one of the arms is a loop $q^4$ which serves as a hand hold when the rod is turned vertically as shown in dotted lines in Fig. 1.

By my invention it will be seen that the parts employed are both few in number and of simple but strong construction, and consequently durable. The peculiar means employed for propelling the machine while susceptible of being operated with a minimum amount of labor, are very positive and powerful in action, and insure a steady movement to the machine. The strain moreover is so distributed as to preclude the wearing or fracture on any particular part, and consequently the machine will last a comparatively long time.

I claim as my invention—

1. In combination, a driving sprocket chain, a reciprocated hook adapted to engage the chain during its traverse in one direction, and carrying a spring-controlled pin, and a fixed device in the path of said pin for engaging the latter to cause the disengagement of the hook from the chain during its traverse in the opposite direction.

2. In combination, a driving sprocket chain, a hook adapted to engage said chain during its active traverse, and carrying a vertically movable spring-controlled pin, means for horizontally reciprocating said hook, and a fixed carrier bar for engaging said pin to cause the disengagement of the hook from the chain during its idle traverse.

3. In combination with a sprocket chain, a hook adapted to engage said chain during one traverse, and provided with a vertical slot, a spring-controlled pin carrying a roller and movable in said slot, means for horizontally reciprocating said hook, and a fixed carrier bar adapted by engagement with said roller when the latter is lowered to maintain the engagement of the chain and hook during the active traverse, and to disengage the hook when said roller is raised during the idle traverse.

4. In a velocipede, the combination of a driving sprocket chain or chains, a hook for engaging one of the links of the chain during its active traverse, and means in the path of the hook for disengaging and supporting the latter during its idle traverse a slide box having pivotal connection with said hook, and means for reciprocating said slide box by the combined action of the hand and foot, consisting of a pedal rigid with said box and a pivoted hand lever, the lower end of which is loosely connected with said box.

5. In a velocipede, the combination of two driving sprocket chains, two slide boxes arranged to be reciprocated on the side frames of said velocipede, a hook pivoted to one end of each of said boxes and adapted to engage during its active traverse one of the links of said chain, inclined carrier bars for disconnecting and supporting the hooks during their idle traverse, foot pedals on the other end of the boxes, two rollers on each box, and a hand lever pivoted to the frame and terminating in two arms each of which is confined between the rollers on one of the boxes, all substantially as and for the purpose described.

In testimony whereof I affix my signature in presence of two witnesses.

NEIL SMITH.

Witnesses:
  W. C. OWEN,
  JAMES CHISHOLM.